Jan. 23, 1968 A. RENZAGLIA 3,364,602
ROOT CUTTER

Filed Aug. 6, 1964 2 Sheets-Sheet 1

INVENTOR.
ALBINO RENZAGLIA
BY
Cyril M. Hajewski
ATTORNEY 3,364,602
ROOT CUTTER
Albino Renzaglia, 5336 S. 13th St.,
Milwaukee, Wis. 53221
Filed Aug. 6, 1964, Ser. No. 387,874
5 Claims. (Cl. 37—94)

This invention relates generally to a power operated root cutter, and more particularly to an improved root cutter for severing live tree roots that are embedded in the earth.

The power cutting of tree roots growing in the soil presents a problem inasmuch as the power equipment must perform the two functions of first penetrating the earth above the roots and then severing the roots. Of course, the ideal tool for cutting the wood fiber roots is a saw. However, the soil above such roots is frequently sandy and contains stones as well as other debris. If an operating saw is fed through such soil, the high speed operation through the soil rapidly dulls its cutting edges so that it becomes inadequate to properly perform the function of sawing through the roots. On the other hand, in the past, every effort to employ an apparatus that is suitable for excavating the dirt above the roots results in a stalling of the power equipment as soon as the roots are contacted.

For lack of equipment suitable to both penetrate the soil and sever the roots it has been the practice to employ two separate machines. One machine removes the soil above the roots and then a power saw is operated to sever the roots. This method is considered to be the most economical in view of the damage incurred by a cutting apparatus when penetrating the earth. It has been found that it is worth the extra labor involved to protect the expensive equipment.

The present invention drastically reduces the labor required and minimizes the amount of equipment involved in cutting tree roots. This is accomplished by providing a single machine that will both remove the dirt above the roots and sever the roots. The machine will penetrate sandy soil containing stones and other debris without damaging the machine and without resulting in any more maintenance of the machine than is normally required in conventional excavating machines.

It is therefore a general object of the present invention to provide an improved root cutting machine that is capable of efficiently performing both functions of removing the dirt above the roots and severing the roots.

Another object of the invention is to provide a root cutting machine that is especially adapted to remove dirt containing stones and other debris from above the roots that are to be cut without detracting from the ability of the same machine to sever large tree roots embedded in the dirt.

Another object is to provide an improved power operated root cutter capable of removing the dirt above the roots as well as severing the roots without requiring an excessive amount of maintenance to keep the machine in efficient operating condition.

A further object is to provide a power operated root cutter which is especially adapted to produce vibrations and chatter in the root cutting elements to enable them to sever the roots with relatively dull cutting edges.

A further object is to provide an improved power operated root cutter that is of simple and inexpensive but sturdy construction and which is extremely efficient in operation.

According to this invention the improved root cutter comprises a boom pivotally supported at one end by a base, preferably a mobile base such as a tractor. The boom extends outwardly of the tractor and rotatably supports a wheel at its opposite end with excavating and root cutting buckets mounted on the periphery of the wheel. A source of power is connected to rotate a drive sprocket which is connected by a continuous chain with a driven sprocket mounted to rotate with the wheel so that the power rotation of the drive sprocket is transmitted by the chain to the driven sprocket for rotating the wheel to actuate the buckets in their operating movement. Suitable idler sprockets are adjustably carried by the boom for regulating the slack in the continuous chain. An appropriate driving mechanism is also provided for pivoting the boom to feed the wheel in an arcuate path into the earth and removing it therefrom.

The mounting of the wheel and its driving mechanism are extremely important to achieving the new results produced by the present invention. It has been the belief of the workers skilled in the art that apparatus of this type must be designed to eliminate vibration as much as possible and every effort was exerted to reduce the amount of backlash in the transmission which transmits the power to the cutting and excavating elements. As a result, separate equipment was required for excavating the earth and for cutting the roots. They each performed their operation very efficiently, but neither had the versatility to adequately perform both functions.

The present invention represents a sharp deviation from the above practices. In the present invention the wheel is mounted on the end of a boom and the power is transmitted to the wheel by a chain and sprocket assembly for the specific purpose of inducing vibration into the wheel. Moreover, the chain is adjustable to produce backlash that is coordinated with the spacing of the cutting elements on the wheel so that each of the cutting elements on the wheels strikes the root being cut with a hammer blow to cause the root to be severed even though the cutting elements engage the root with relatively dull cutting edges. The backlash in the chain is adjusted to conform to the spacing of the cutting elements on the wheels so that as each cutting element engages the root, it stalls for an instant of time, and as this occurs the power unit takes up the backlash in the chain. Since such backlash is taken up by the power unit, as the cutting element breaks through the root to relieve the stall, the succeeding cutting element on the wheel is moved with great rapidity into engagement with the root to cut into another portion of the root along the cutting line. Thus, the cutting elements engage the root with a series of sharp hammer blows by reason of the backlash in the chain, and this action in combination with the vibration in the wheel enables the relatively blunt edges of the cutting elements to sever the root.

The foregoing and other objects of this invention, which will become more fully apparent from the following detailed description of an embodiment thereof may be achieved by the apparatus herein described by way of example in connection with the illustration of its structural components in the accompanying drawings, in which.

Figure 1:
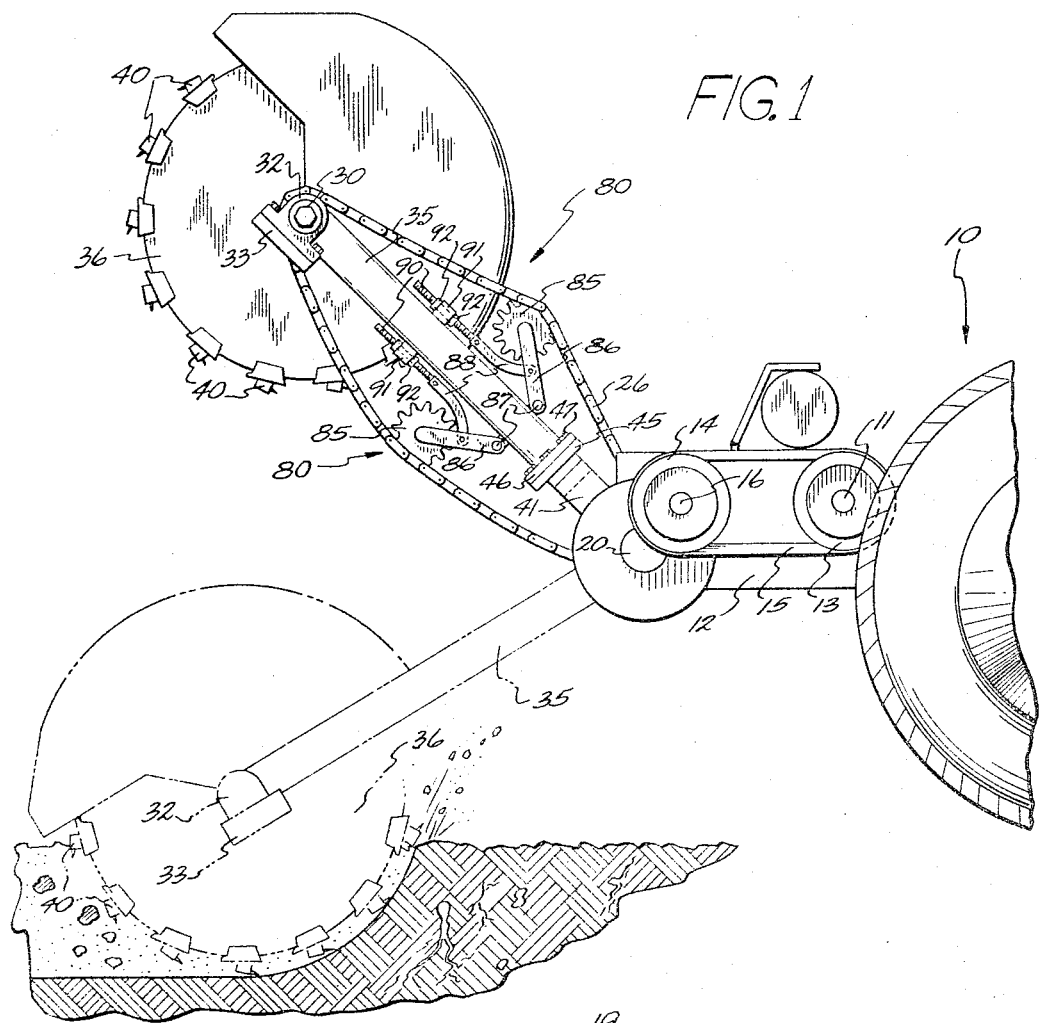
FIGURE 1 is a side elevational view of a root cutter incorporating the features of the present invention with only a portion of the supporting tractor being shown.

Reference is now made more particularly to the drawings and specifically to FIG. 1 thereof illustrating a side elevational view of the apparatus comprising the present invention. In the illustrated embodiment the root cutting mechanism is shown mounted on a tractor generally identified by the reference numeral 10 with only a portion of the tractor being illustrated. The tractor 10 is of conventional construction which serves to provide a source of power for actuating the root cutting mechanism as well as for providing mobility to it. It should be understood, of course, that other supporting structure may be provided for this purpose.

The tractor 10 includes a power take-off shaft 11 that is driven by the motor (not shown) of the tractor. A pulley 13 is keyed to rotate with the shaft 11 for rotating a cooperating pulley 14 through a V belt 15 that is in operating engagement with both pulleys 13 and 14 for transmitting the drive to rotate an input shaft 16 that is keyed to the pulley 14. Rotation of the shaft 16 serves as an input to a gear box 12 which transmits the drive from the shaft 16 to an output shaft 20. The shaft 20 extends outwardly of the gear box 12, through a pair of legs 17 and 18 of a channel shaped bracket generally identified by the reference numeral 19. The extending end of the shaft 20, beyond the leg 17, is journalled in a bracket 21.

Figure 2:
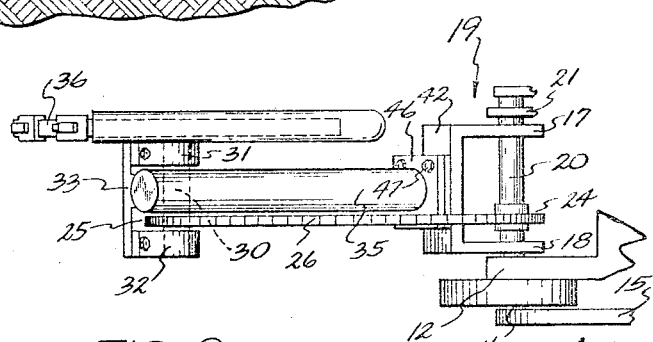
FIGURE 2 is a fragmentary detail view depicting a portion of the drive for actuating the drive chain illustrated in FIGURE 1.

A drive sprocket 24 is fixed to rotate with the shaft 20 for driving a cooperating sprocket 25 through a drive chain 26 that is in engagement with both sprockets 24 and 25 as clearly shown in FIG. 2. The sprocket 25 is keyed to rotate with a shaft 30 that is journalled in a pair of bearings 31 and 32 which are supported by a bearing bracket 33 that is mounted on the extending end of a boom 35. A wheel 36 is keyed to rotate with the shaft 30 and a plurality of relatively small excavating buckets 40 are mounted on the periphery of the wheel 36 to travel in a circle with the rotation of the wheel for excavating through the soil and debris as well as for severing the roots growing in the soil.

The boom 35 is pivotable about the axis of the shaft 20 for lowering the wheel 36 and its cooperating buckets 40 into the soil and raising it therefrom. To this end, the boom 35 extends axially from a cylindrical support 41 that is mounted on a web 42 of the channel 19. The support 41 is provided with a lower flange 43, shown in FIG. 3, which is secured by suitable bolts 44 to the web 42 for pivotal movement with the channel 19 about the shaft 20. The opposite end of the support 41 is provided with an upper flange 45 as best shown in FIG. 1. The upper flange 45 is complementary to a flange 46 formed on the lower end of the boom 35 and the flanges 45 and 46 abut each other and are secured together by bolts 47 for rigidly securing the boom 35 to the support 41 in co-axial alignment. Accordingly, the boom 35 will pivot in a vertical plane with the pivotal movement of the bracket 19 about the shaft 20. Such pivotal movement of the boom 35 serves to move the wheel 36 in an arcuate path for feeding it into the earth and for removing it upwardly therefrom.

Figure 3:
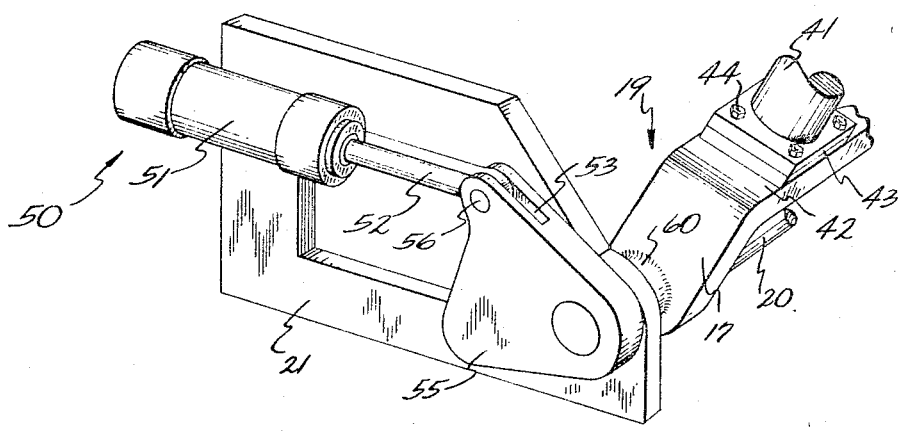
FIGURE 3 is a detail fragmentary perspective view of the drive mechanism for pivoting the boom shown in FIGURE 1.

The pivotal movement of the bracket 19 for operating the wheel 36 in this manner is accomplished by hydraulic power through a piston and cylinder mechanism generally identified by the reference numeral 50 and clearly shown in FIG. 3. The mechanism 50 includes a cylinder 51 rigidly mounted in the bracket 21. A movable piston rod 52 extends outwardly of the cylinder 51 and is provided with a flattened end that extends into a kerf 53 formed in a crank 55. A pin 56 extends through the crank 55 and the flattened end of the piston rod 52 for pivotably connecting the latter to the crank 50. A sleeve 60 embraces the shaft 20 and is secured to both the crank 55 as well as the leg 17 of the bracket 19. The sleeve 60 extends through the bracket 21 and is rotatable relative thereto as well as relative to the shaft 20. As a result, when the piston rod 52 is extended from the cylinder 51 by hydraulic pressure, it produces a pivotal movement of the crank 50 about the shaft 20. The sleeve 60 and the bracket 19 pivot with the crank 55 in a clockwise direction, as viewed in FIG. 3, to produce a corresponding pivotal movement of the boom 35 for lowering the wheel 36 toward the soil. On the other hand, when the direction of fluid flow in the cylinder 51 is reversed, the piston rod 52 is retracted for pivoting the crank 55 in a counterclockwise direction about the shaft 20 to produce a corresponding pivotal movement of the bracket 19 and its associated boom 35 for raising the wheel 36 away from the ground.

Figure 4:
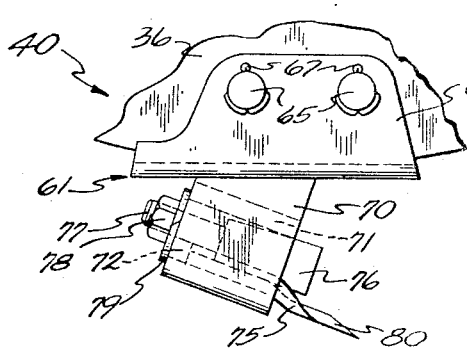
FIGURE 4 is an enlarged detail side elevational view of one of the digging and cutting buckets shown mounted on the wheel in FIGURE 1.
Figure 5:
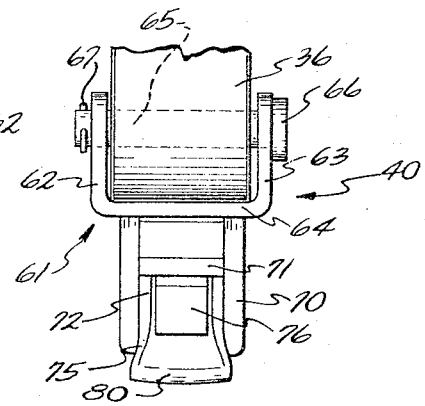
FIGURE 5 is a front elevational view of the bucket depicted in FIGURE 4.

The buckets 40 are clearly shown in the detailed views of FIGS. 4 and 5, and include a U-shaped bracket 61. Each of the brackets 61 comprises a pair of legs 62 and 63 joined at the bottom by a web 64. A pair of pins 65 extend through both legs 62 and 63 as well as through the wheel 36 for securing the bracket 61 to the wheel 36. One end of the pins 65 is provided with a head 66 while the opposite end is provided with a transverse hole for receiving a cotter key 67 to secure the pins 65 in operating position on the wheel 36.

A hollow bracket 70 is mounted on the plate 64 of the bracket 61 to extend outwardly therefrom. The bracket 70 includes a cross plate 71 for forming a hollow 72 which receives a scoop 75. The rearward portion of the scoop 75 extends into the hollow 72 and is secured therein by a tapered block 76 which is of rectangular cross section to accommodate the rectangular cross-section of the hollow 72. The small end of the block 76 is smaller than the cross sectional dimensions of the hollow 72 while the opposite end of the block 76 is of greater cross sectional dimension than the cross sectional dimension of the hollow 72. A threaded rod 77 extends longitudinally from the small end of the block 76 for receiving a nut 78. The nut 78 is threaded on the rod 77 and bears against a plate 79 that overlies the open end of the bracket 70. As the nut 78 is tightened against the plate 79 it draws the block 76 into the hollow 72 until the large end of the block 76 is tightly wedged within the hollow 72 of the bracket 70 for rigidly securing the scoop 75 to the bracket 70. The outer edge of the scoop 75 is provided with an edge 80 that penetrates the soil and scoops it out of the trench and also severs any roots which may be growing in the soil.

It is important to the practice of the present invention that the chain 26 be provided with a proper amount of slack for efficient operation in severing the roots that are encountered in the soil. To this end, a pair of adjusting mechanisms generally identified by the reference numeral 80 are provided for accurately regulating the amount of slack in the chain 26. The adjusting mechanism 80 are identical in construction and therefore a description of one will apply to the other as well. They are mounted on opposite sides of the boom 35 so that the slack can be adjusted in the chain 36 on both sides of the sprockets.

Each of the adjusting mechanisms 80 comprises an idler sprocket 85 rotatably supported on a pivotable beam 86. The beam 86 is pivotably carried on a pin 87 that is secured to the boom 35. Thus, one end of the beam 86 is pivotably carried by the pin 87 while the idler sprocket 85 is rotatably supported at the opposite end of the beam 86. A curved bar 88 has an extending end pivotably attached to the center of the beam 86 intermediate the pin 87 and the axis of the idler sprocket 85, with the opposite end of the bar 88 being fixed to a stud 90. The stud 90 extends through a bore formed in a bracket 91 that is mounted on the boom 35 and a pair of nuts 92 are threaded on the stud 90 with one nut 92 being located on each side of the bracket 91.

With this arrangement, the nuts 92 may be rotated relative to the stud 90 for axially shifting the position of the stud relative to the bracket 91. Such shifting of the stud 90 causes a corresponding shifting of its associated bar 88 to produce a pivotal movement of the beam 86. This causes an arcuate movement of the idler sprocket 85 either toward or away from the boom 35 for either adding slack to the chain 26 or removing the existing slack. Thus, if it is desired to add slack to the chain 26, the nut 92 on the lower side of the bracket 91, as viewed in FIG. 1, will be threaded toward the end of the stud 90 that is attached to the bar 88. The opposite nut 92 will then be threaded and tightened against the bracket 91 to cause an axial shifting of the stud 90 toward the wheel 36. This will cause a pivotal movement of the beam 86 to produce a movement of the idler sprocket 85 toward the boom 35 for adding slack to the chain 26. The slack in the chain 26 therefor can be accurately adjusted on both sides of the sprockets 24 and 25.

An important feature of the root cutter of the present invention lies in the fact that the mounting of the excavating wheel 36 on the extending end of the boom 35 and the provision of the buckets 40 spaced about the periphery of the rotating wheel 36 results in a substantial amount of vibration in the wheel 36. Rather than detracting from the efficiency of the mechanism this vibration assists in severing the roots that are encountered in the soil despite the fact that the cutting edges 80 of the buckets 40 are not sharp knife edges. This feature cooperates with the slack in the chain and sprocket drive to facilitate the severing of the roots by the buckets 40 so that a single machine performs both the excavating of the soil above the roots as well as the cutting through the roots.

The slack in the chain 26 is adjusted in accordance with the spacing of the buckets 40 on the wheel 36 so that the cutting edge 80 of the buckets 40 engages the roots with a hammer blow as it is vibrating due to the vibration in the wheel 36. As the edge 80 of each scoop 75 engages a root in the soil, the wheel 36 will stall for an instant and the drive sprocket 24 will take up the slack on the chain 26 on one side and increase the slack on the other side of the sprocket. As the cutting edge 80 breaks through the root due to the force being applied to it by the drive sprocket 24 and its vibratory movement, the severing action is completed, the resistance presented by the root, of course, is removed and the slack that was accumulated in the chain 26 on one side of the driving sprocket 24 permits a rapid incremental rotation of the wheel 36 until it is again stalled by the succeeding bucket 40 engaging the root with a hammer blow. The process is then repeated to enable the next bucket to strike the root with a hammer blow. The chain 26 therefore serves to repeatedly store a portion of the energy delivered by the power take-off shaft 11 through the shifting of the slack in the chain and the accumulated power is instantaneously released to produce the series of sharp blows to the embedded roots for severing them.

It should be understood that these hammer blows are dealt to the root in an extremely rapid succession which may even appear as a steady rotation of the wheel 36 with a substantial amount of vibration. Nevertheless, such hammer blows are delivered against the root by the buckets 40 and this feature cooperates with the vibration induced in the wheel 36 as a result of the structural arrangement to produce a severing of the roots by the relatively blunt cutting edge 80 of the buckets 40. Because of the bluntness of the edge 80, the latter is not adversely affected by the pebbles and stones and other debris that may be encountered in the soil so that the buckets 40 are very effective in excavating through the soil and yet will efficiently sever the roots that are growing in the soil.

The operator, of course, will regulate the feeding movement of the boom 35 and its associated wheel 36 into the roots, in accordance with the size of the roots that are being severed so that the hammer blows will enable the cutting edge 80 to break through the root fibers. When larger roots are encountered the operator will reduce the feed rate of the wheel 36 into the roots while a more rapid feed rate may be utilized for smaller roots. With very little experience the operator will easily become acquainted with the proper feed rate for a given rate of rotation of the wheel 36 to maintain the efficient operation of the machine.

From the foregoing detailed description of the construction and operation of the illustrative embodiment of the present invention it will become apparent that a new and improved root cutter has been provided that may be employed for excavating the soil and debris above the roots as well as for severing the roots that are embedded in the soil. This has been accomplished by inducing vibration into the excavating and cutting elements and arranging for their intermittent movement so that each strikes the root with a sharp hammer blow.

Although the illustrative embodiment of the present invention has been described in considerable detail for the purpose of making a full disclosure of a practical operative arrangement by means of which the invention may be practised, it is to be understood that various novel features of the invention may be incorporated in other arrangements without departing from the spirit and scope of the invention as defined in the subjoined claims.

The principles of the invention having now been fully explained in connection with the foregoing description of embodying structure, I hereby claim as my invention:

1. In a root cutting machine for severing roots embedded in soil; a mobile frame; a plurality of excavating buckets carried by said frame for movement in a definite path of travel; feeding means for feeding said buckets into the soil as they are moving in their path of travel; a cutting edge on each of said buckets; and drive means actuating said buckets in their path of travel in an intermittent motion when roots are encountered in the soil so that the roots are struck by said cutting edges with sharp blows that are dealt in rapid succession by successive cutting edges for facilitating the severing of the roots.

2. In a root cutting machine for severing roots embedded in soil; a frame; a plurality of buckets carried by said frame for movement in a specific path of travel; a cutting edge on each of said buckets; a source of power; actuating means driven by said source of power and connected to actuate said buckets in their path of travel in increments when a root is encountered by said cutting edges so that they move intermittently with each bucket striking the root a sharp blow to facilitate the severance of the root fibers by said cutting edges; and means mounting said buckets on said frame to produce a vibration in said buckets when they are being actuated by said source of power.

3. In a root cutting machine for severing roots embedded in soil; a frame; a wheel rotatably carried by said frame; a plurality of buckets equally spaced about the periphery of said wheel for excavating the soil as said wheel is fed into the soil; a cutting edge on each of said buckets in position to engage the roots embedded in the soil for severing them; feeding means connected to move said wheel into the soil and retract it therefrom; a source of power; and actuating means driven by said source of power and connected to rotate said wheel in increments approximating the spacing of said buckets on the periphery of said wheel so that said wheel rotates intermittently to cause each of said cutting edges to strike the root a sharp hammer blow to facilitate the severance of the root fibers.

4. In a root cutting machine for severing roots embedded in soil; a frame; a wheel rotatably carried by said frame; a plurality of buckets spaced along the periphery of said wheel for excavating the soil as said wheel is fed into the soil; a cutting edge on each of said buckets in position to engage the roots embedded in the soil for severing them; feeding means connected to move said wheel into the soil and retract it therefrom for completing an excavating and root cutting operation; a source of power; a transmission actuated by said source of power and connected to rotate said wheel; and means in said transmission for absorbing power from said source and releasing the absorbed power instantaneously so that said wheel may stall for an instant when one of said cutting edges engages a root and as the cutting edge breaks through the root the energy in the transmission is instantaneously released to rapidly rotate said wheel until the succeeding cutting edge engages the root; whereby said wheel is driven in an intermittent motion with each of said cutting edges striking the root with a sharp hammer blow to facilitate severing the root fibers.

5. A root cutting machine according to claim 4, including means mounting said wheel on said frame to cause said wheel and its associated buckets to vibrate while it is being rotated by said source of power.

References Cited

UNITED STATES PATENTS

| | | | |
|---|---|---|---|
| 2,652,641 | 9/1953 | Zowaski | 37—94 X |
| 2,909,855 | 10/1959 | Kolbe | 37—96 X |
| 1,547,360 | 7/1925 | Byrd | 172—125 X |
| 2,241,383 | 5/1941 | Barnett | 37—94 |
| 2,714,773 | 8/1955 | Stewart | 37—86 |
| 2,746,492 | 5/1956 | De Hardit | 143—32 |
| 2,780,014 | 2/1957 | Arps | 37—142 X |
| 3,146,538 | 9/1964 | Kiselev et al. | 37—80 |

FOREIGN PATENTS

| | | |
|---|---|---|
| 1,228,997 | 3/1960 | France. |

ABRAHAM G. STONE, *Primary Examiner.*

R. L. HOLLISTER, *Assistant Examiner.*